Figure 1:
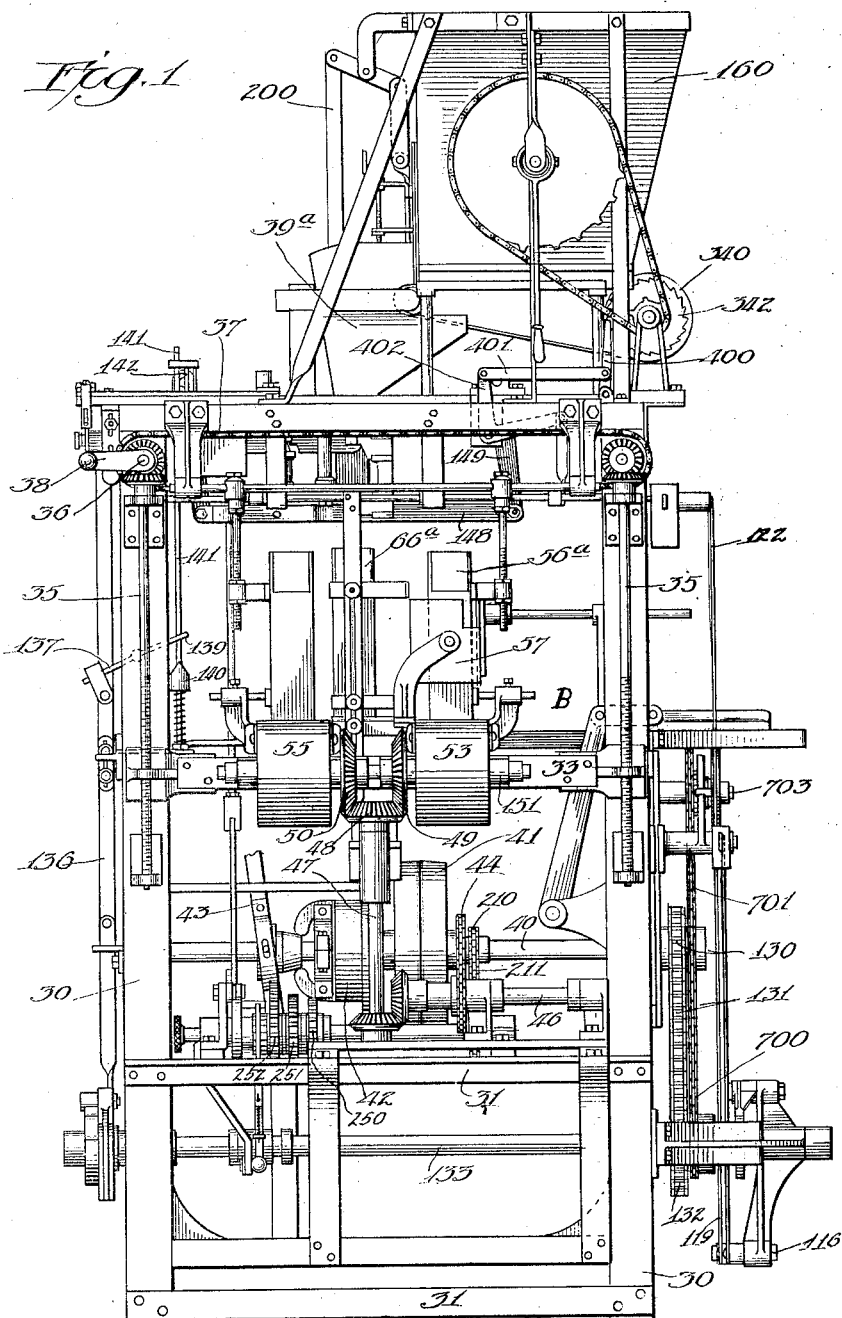

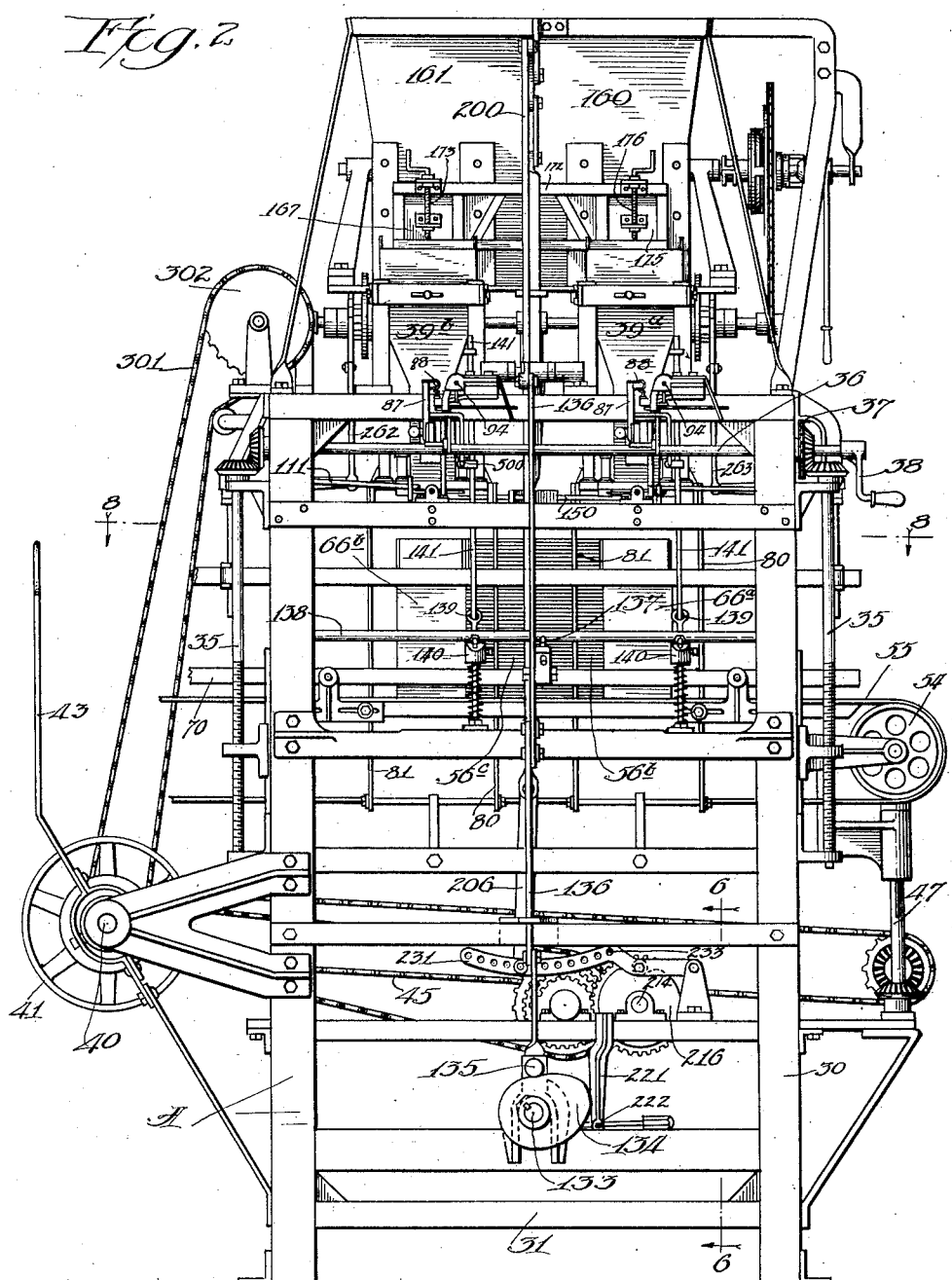

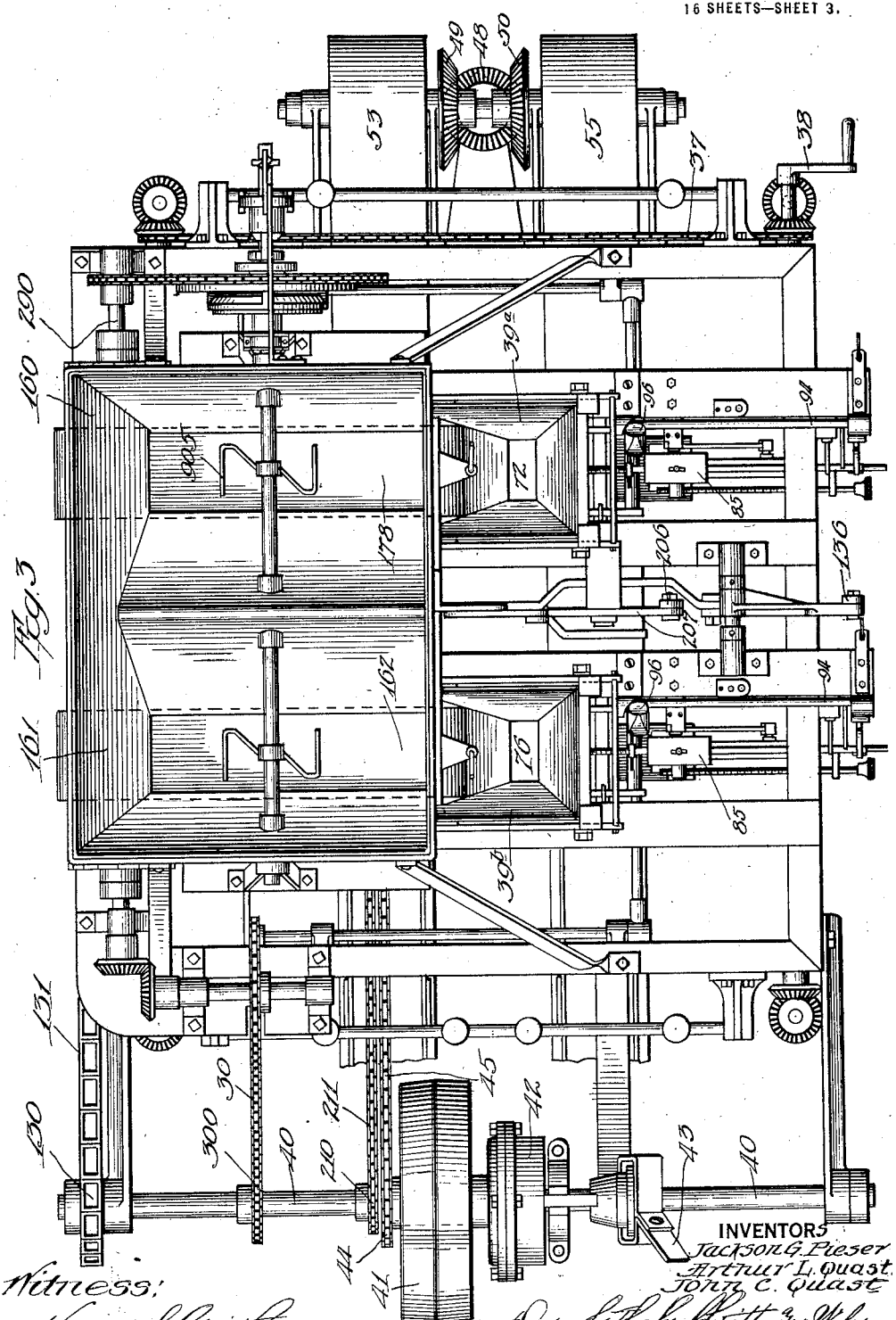

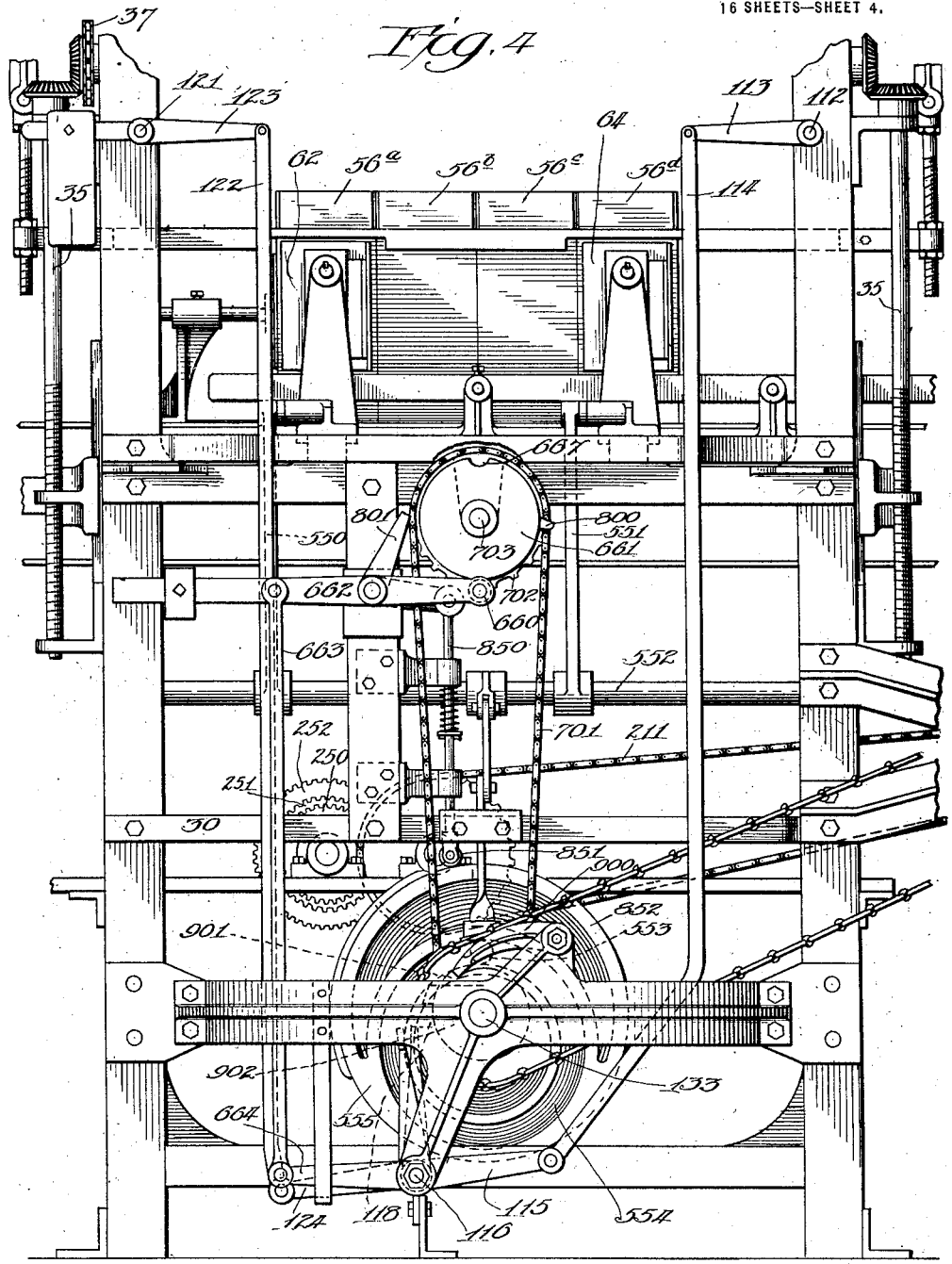

J. G. PIESER AND A. L. AND J. C. QUAST.
AUTOMATIC WEIGHING MACHINE.
APPLICATION FILED NOV. 13, 1920.

1,428,253.

Patented Sept. 5, 1922.
16 SHEETS—SHEET 5.

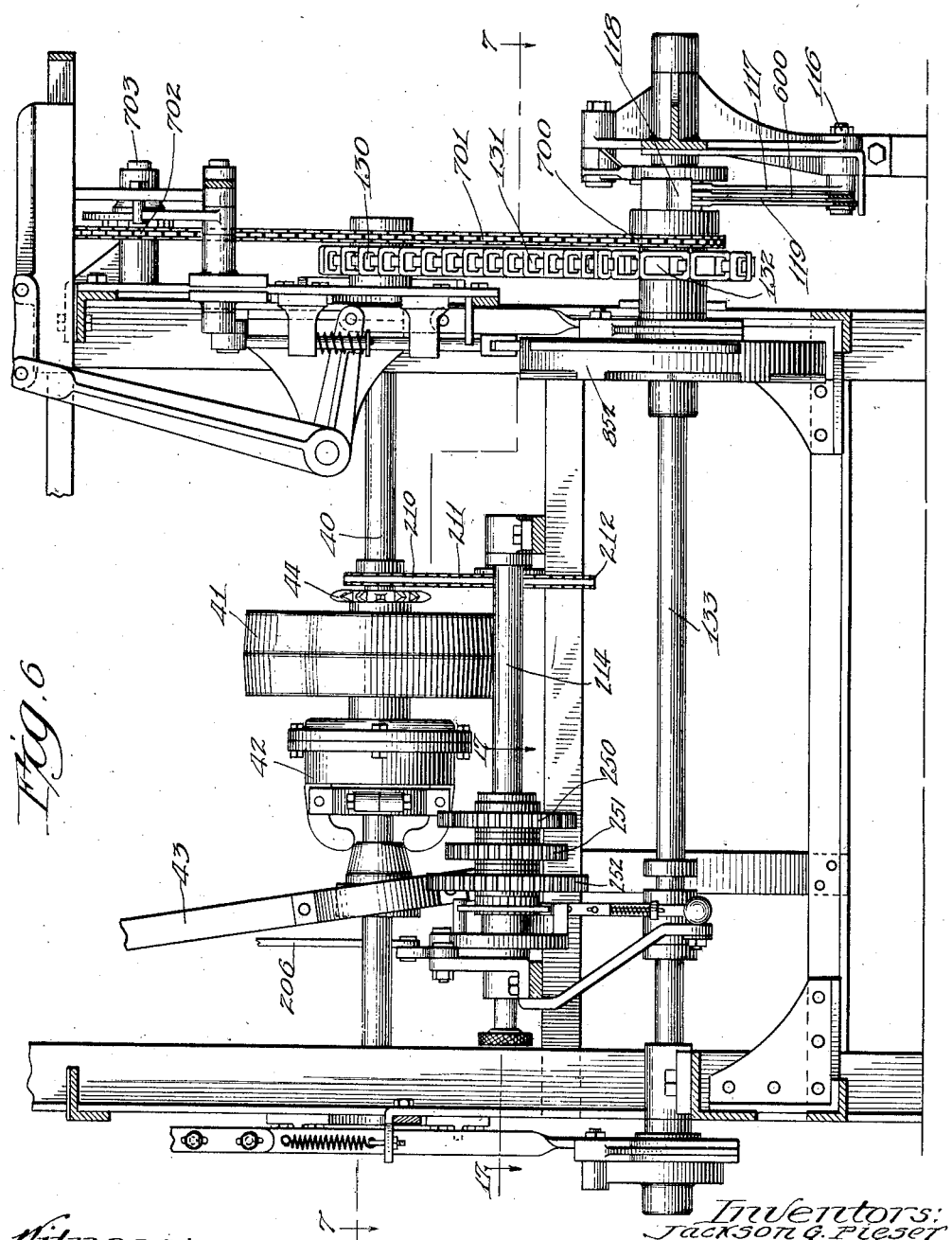

J. G. PIESER AND A. L. AND J. C. QUAST.
AUTOMATIC WEIGHING MACHINE.
APPLICATION FILED NOV. 13, 1920.
1,428,253.
Patented Sept. 5, 1922.
16 SHEETS—SHEET 7.
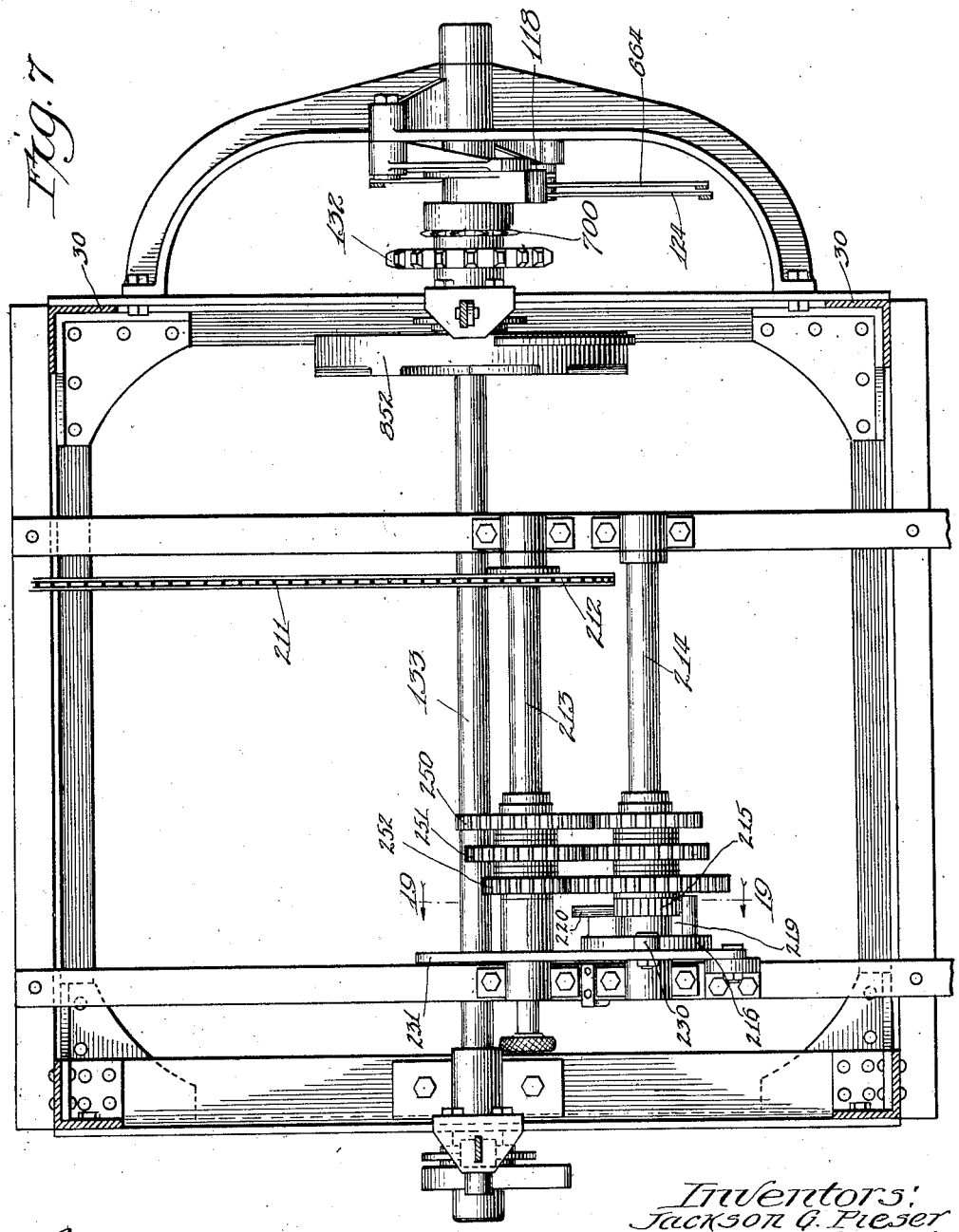
Inventors:
Jackson G. Pieser
Arthur L. Quast
John C. Quast
by Dyrenforth, Lee, Chritton & Wiles
Att'ys
Witness:
Harry S. Gaither

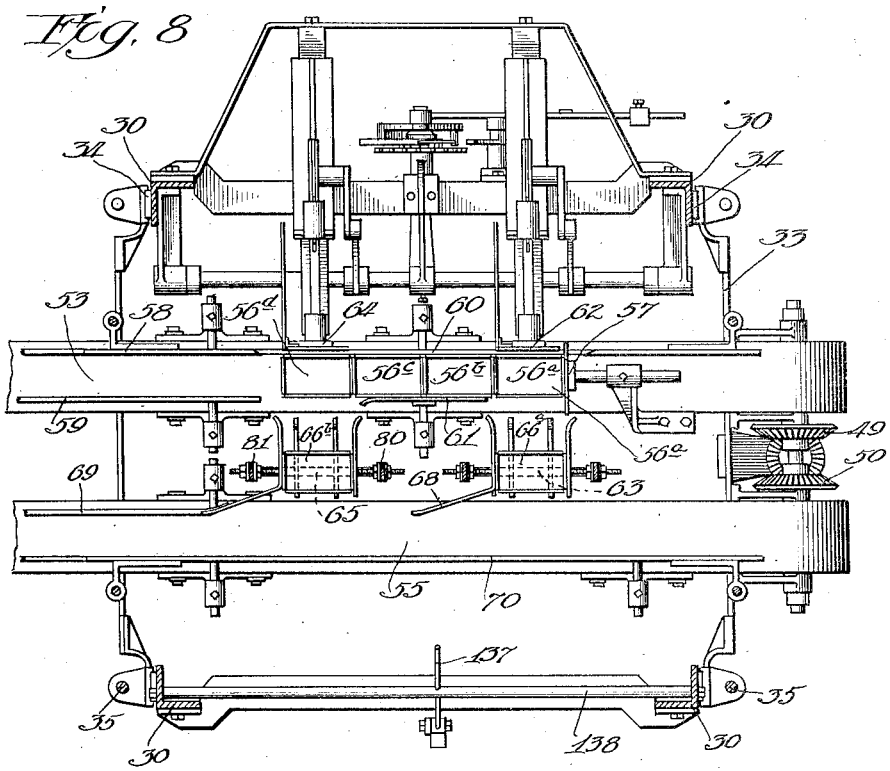

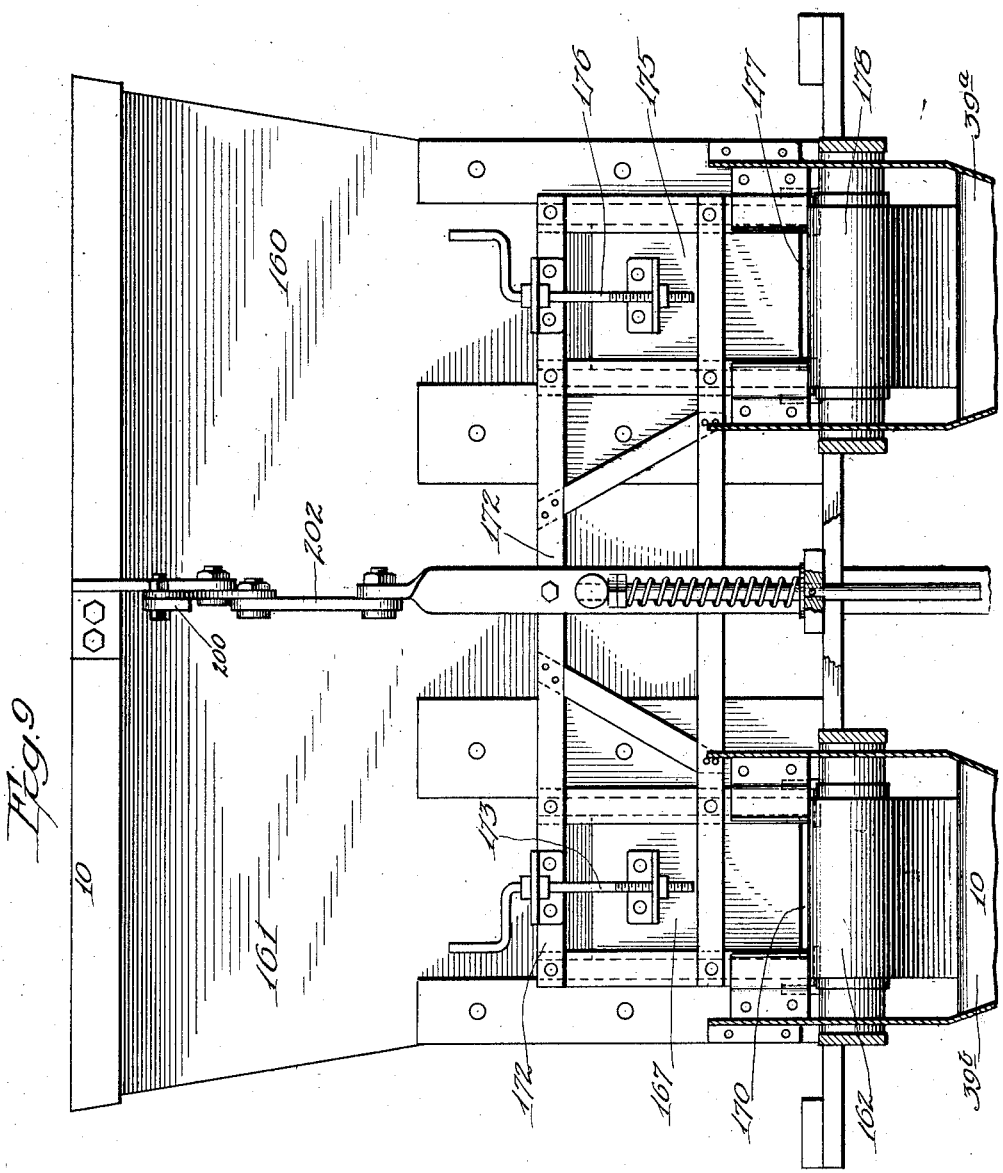

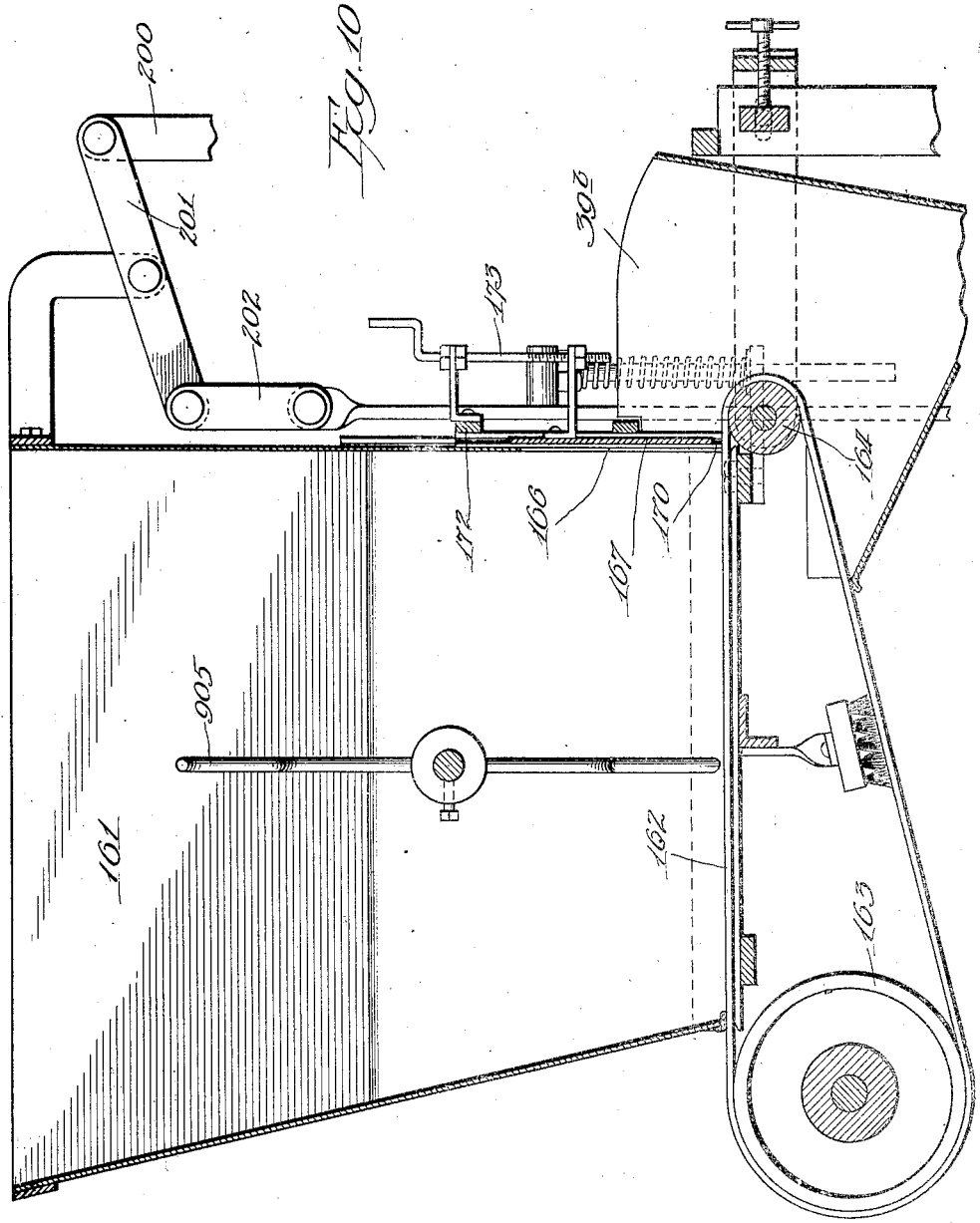

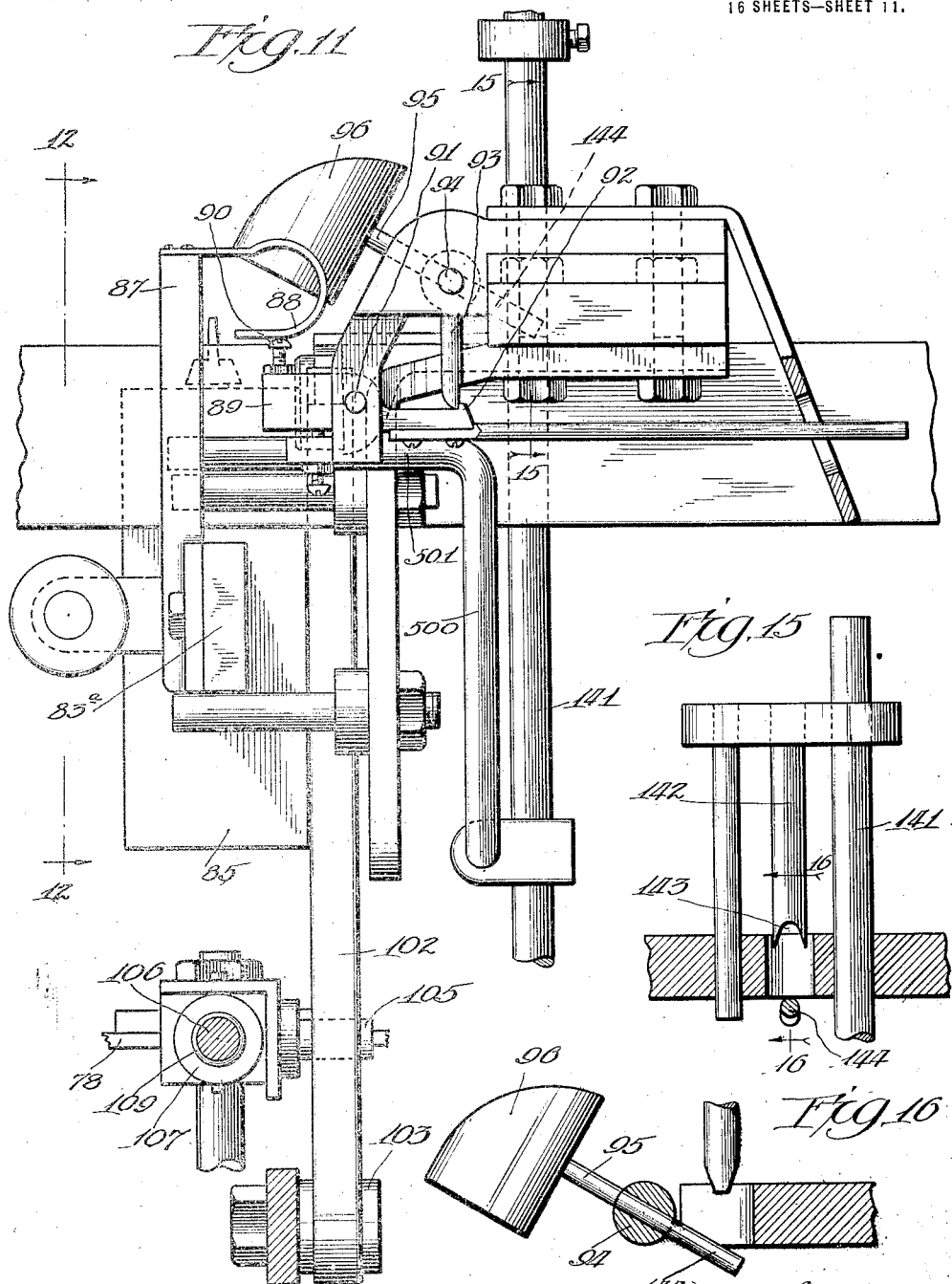

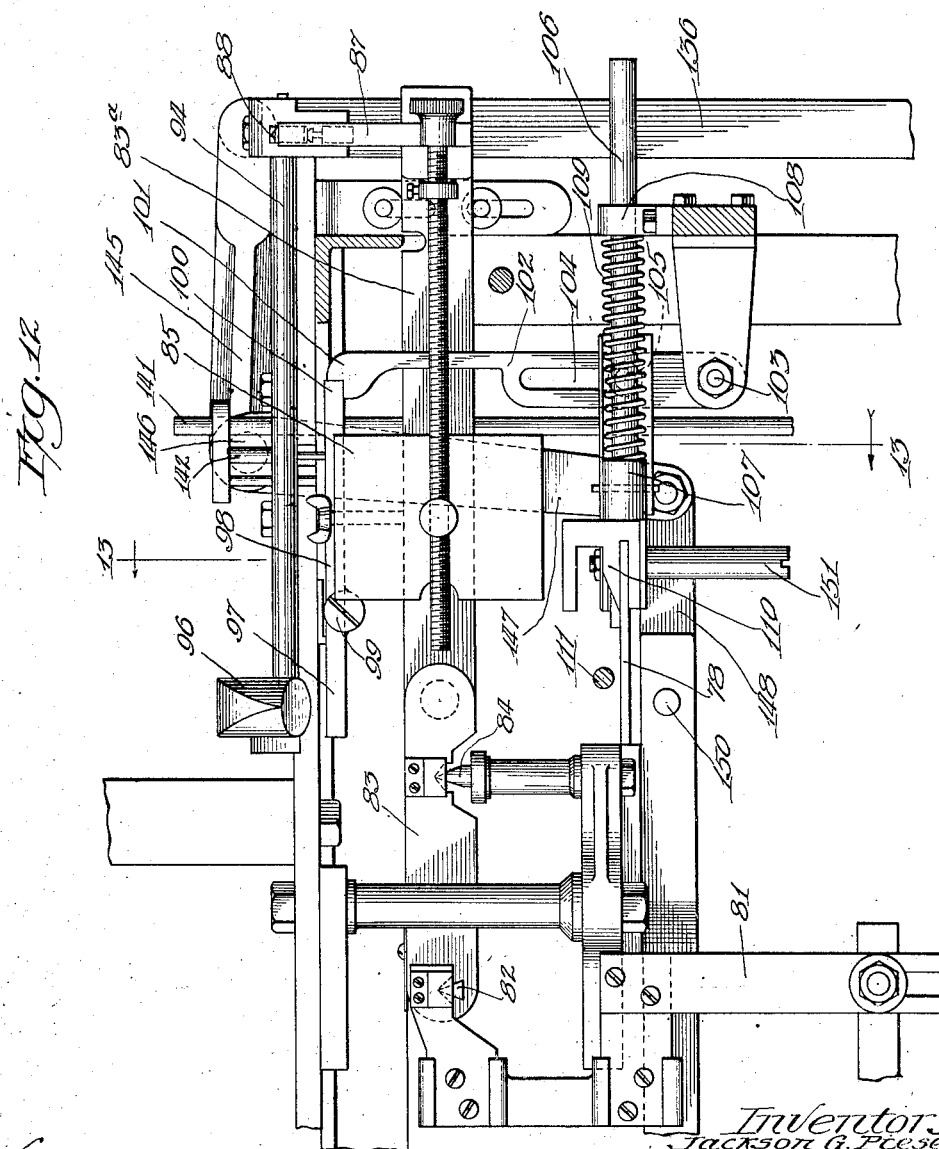

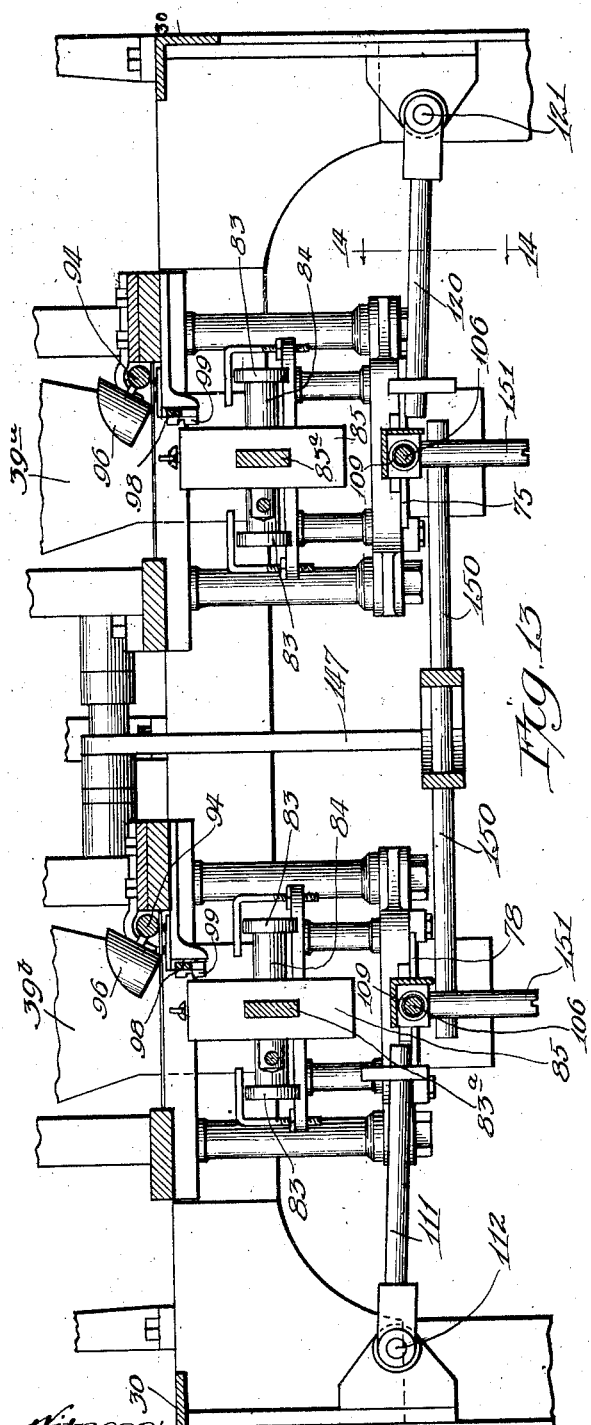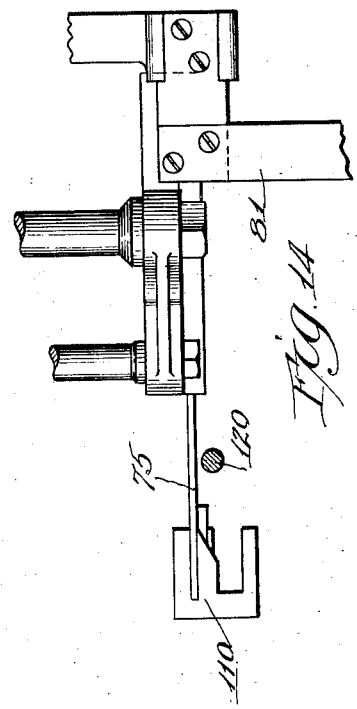

J. G. PIESER AND A. L. AND J. C. QUAST.
AUTOMATIC WEIGHING MACHINE.
APPLICATION FILED NOV. 13, 1920.

1,428,253.

Patented Sept. 5, 1922
16 SHEETS—SHEET 14.

Inventors:
Jackson G. Pieser
Arthur L. Quast
John C. Quast

Witness:
Harry S. Gaither

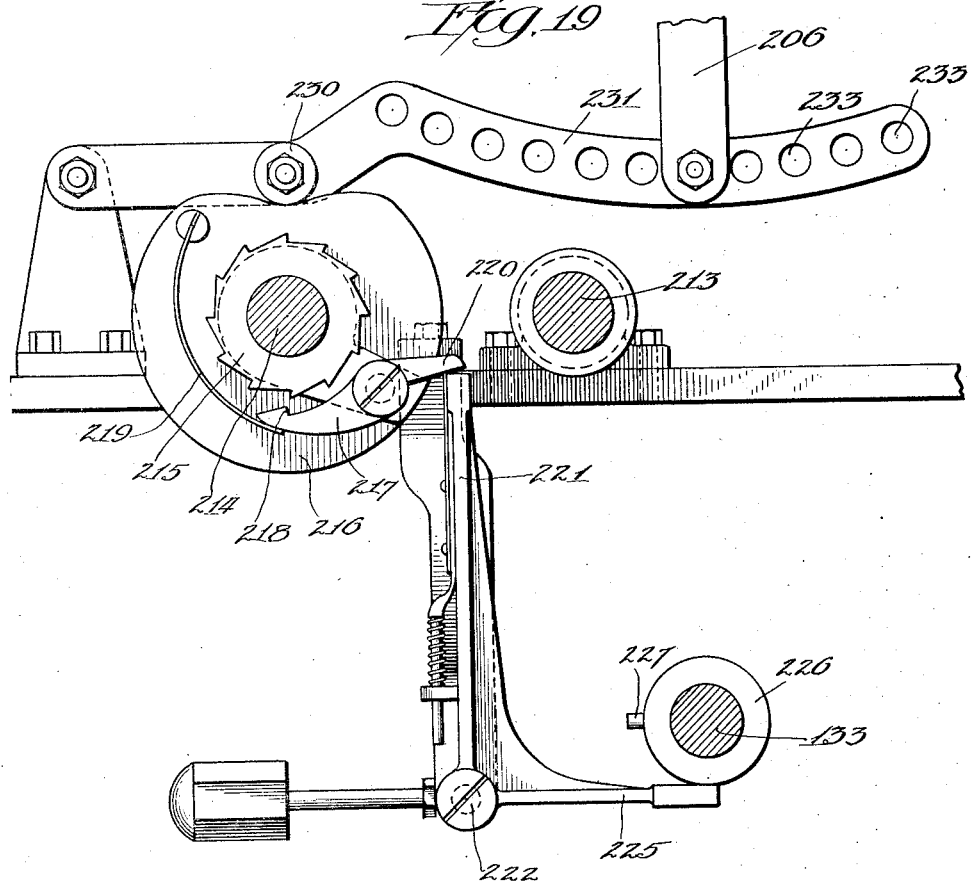

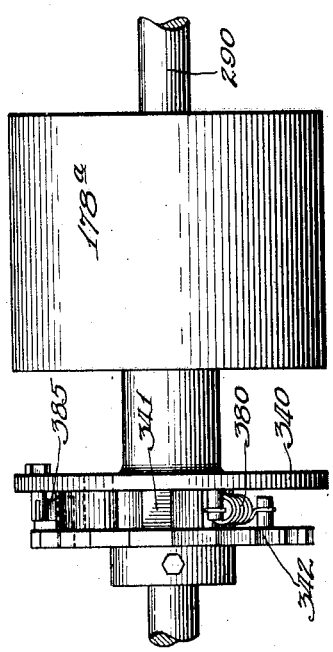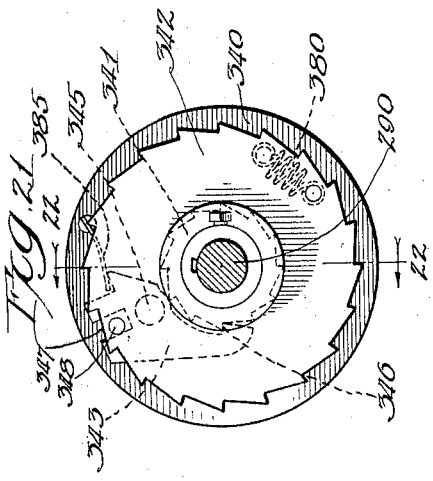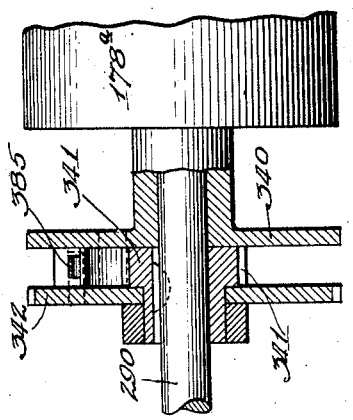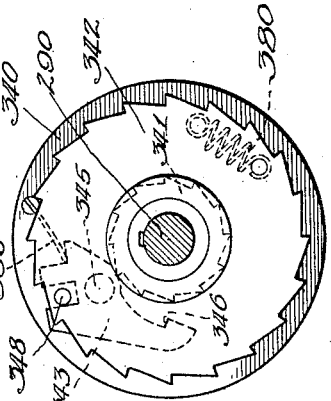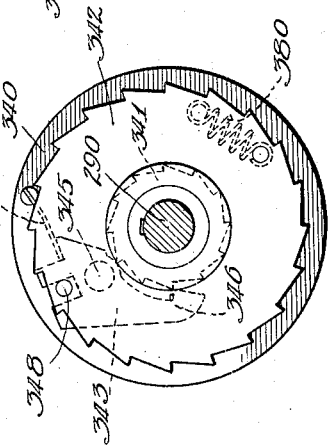

Patented Sept. 5, 1922.

1,428,253

UNITED STATES PATENT OFFICE.

JACKSON G. PIESER, ARTHUR L. QUAST, AND JOHN C. QUAST, OF CHICAGO, ILLINOIS; SAID ARTHUR L. QUAST AND SAID JOHN C. QUAST ASSIGNORS TO SAID PIESER.

AUTOMATIC WEIGHING MACHINE.

Application filed November 13, 1920. Serial No. 423,879.

*To all whom it may concern:*

Be it known that we, JACKSON G. PIESER, ARTHUR L. QUAST, and JOHN C. QUAST, citizens of the United States, residing at Chicago, in the county of Cook and State of Illinois, have invented a new and useful Improvement in Automatic Weighing Machine, of which the following is a specification.

This invention relates to automatic weighing machines and more particularly to a machine adapted to the purpose of filling cartons or other packages with pulverulent or granular material of a predetermined weight; and the primary object of the invention is to provide an improved machine of great durability which will operate with accuracy and certainty at high speeds.

To facilitate an understanding of the detailed description of the invention, which follows, it may be stated at the outset that in the preferred embodiment there are employed: a continuously operating endless belt delivery-conveyer leading to the machine; a parallel continuously operating endless belt discharge-conveyer leading from the machine; two scales each having a lead-platform or scale-pan interposed between the delivery-conveyer and discharge-conveyer; a feed-chute located above each of the scale pans, and adapted to direct material into a carton or package standing on the scale-pan; a storage reservoir in connection with each of the feed-chutes adapted to supply material thereto; means for periodically permitting a relatively large quantity (but less than a full charge) of material to flow quickly from each storage reservoir; means for preventing the depression of the scale-pan from the impact or momentum of such relatively large quantity of material; means for slowly feeding a small stream of material from each reservoir after the discharge of the relatively large quantity; means for automatically and quickly closing a cut-off gate at the bottom of each feed-chute as soon as a quantity of material of predetermined weight has entered the carton underneath; means for automatically stopping the flow of the small stream of material from a reservoir when a quantity of a predetermined weight has entered a carton; means for pushing two empty cartons from the delivery-conveyer onto the two scale-pans, at the same time displacing two loaded cartons from the scale-pans onto the discharge-conveyer, such operation taking place automatically when both of the cartons have received charges of predetermined weights; means for resetting the mechanisms for operating the gates at the bottom of the feed-chutes; and means for controlling and timing the operation of the machine.

In general, the operation is as follows: (assuming that two cartons are standing on the scale-pans and each has received very nearly a full charge, additional material being supplied by a small slowly moving stream flowing from each reservoir) as soon as one carton receives a charge of a predetermined weight, its scale-pan is depressed releasing a trigger mechanism which immediately closes the gate at the bottom of the feed-chute and quickly cuts off further supply of material to the carton. This trigger mechanism also stops the flow of the small stream of material from the storage reservoir. Since the stream flowing from the storage reservoir cannot be positively and quickly stopped, there results an after flow of a small quantity of material which is caught and retained in the feed-chute. The means for closing the gate at the bottom of the feed-chute upon a depression of a scale-pan with the means for stopping the flow of the stream of material from the storage reservoir are made in duplicate, one operating in connection with each scale-pan, and each operating a releasing pawl controlling the operation of the entire machine. As soon as the second carton has been fully charged, its scale-pan depressed, the gate at the bottom of the feed-chute closed, the flow of the stream of material from the storage reservoir stopped, and the second pawl controlling the operation of the entire machine released, the machine makes one complete operation.

During one such complete operation of the machine; two new empty cartons are pushed from the delievery-conveyer onto the scale-pans displacing the loaded cartons and pushing them onto the discharge-conveyer; the gates at the bottom of the feed chutes are re-opened (the after flow from the previous cut-off falling into the cartons) and the trigger mechanism controlling each is reset; a relatively large quantity of material is permitted to flow quickly from each storage reservoir into a carton (the material thus supplied, however, is not sufficient to give quite a complete charge, and depression of the scale-pan from the impact or momentum of such material is prevented); and the supply of additional material is continued by a small slowly moving stream flowing from each storage reservoir.

In general the means for controlling and timing the operation of the machine, operates to limit the machine to one operation at a time, thus preventing continuous operation and serving to stop the machine in the event the other stopping means should fail or not have sufficient time to operate.

It will be noted from the foregoing that, since two cartons are operated upon simultaneously there necessarily is a duplication of many parts and operations. In this specification, in some instances, but one of each of such duplicated parts and operations will be described in detail.

The invention is illustrated in the preferred embodiment in the accompanying drawings, in which—

Figure 17:
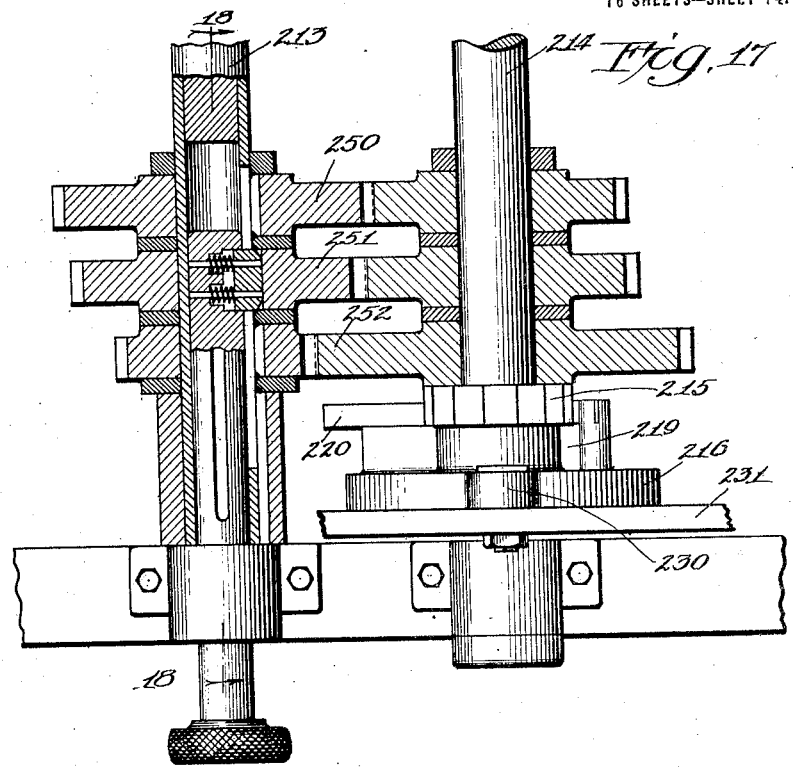
Figure 18:
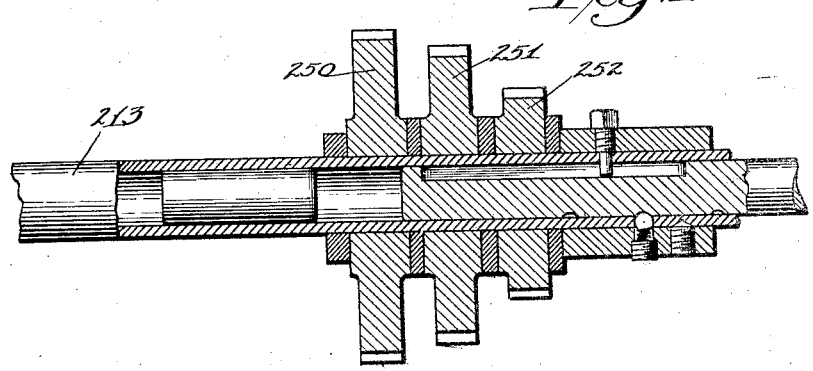

Figure 1 represents an end elevational view of a machine embodying the invention; Fig. 2, a side elevational view of the machine; Fig. 3, an enlarged plan view; Fig. 4, an enlarged elevational view of the lower portion of the machine; Fig. 5, an enlarged elevational view of the upper portion of the machine, showing the same side as Fig. 4; Fig. 6, an enlarged vertical sectional view taken as indicated at line 6 of Fig. 2; Fig. 7, an enlarged horizontal sectional view taken as indicated at line 7 of Fig. 6; Fig. 8, a horizontal sectional view taken as indicated at line 8 of Fig. 2, showing the delivery-conveyer, discharge-conveyer, and scale-pans; Fig. 9, an enlarged elevational view of the upper portion of the machine showing the same side as Fig. 2; Fig. 10, an enlarged vertical sectional view taken as indicated at line 10 of Fig. 9; Fig. 11, an enlarged elevational view showing the trip mechanism controlling one of the cut-off gates at the bottom of a feed-chute; Fig. 12, a vertical sectional view taken as indicated at line 12 of Fig. 11; Fig. 13, a vertical sectional view taken as indicated at line 13 of Fig. 12; Fig. 14, a vertical sectional view taken as indicated at line 14 of Fig. 13; Fig. 15, a vertical sectional view taken as indicated at line 15 of Fig. 11; Fig. 16, a vertical sectional view taken as indicated at line 16 of Fig. 15; Fig. 17, a horizontal sectional view taken as indicated at line 17 of Fig. 6, showing the change speed gears for use in varying the amount of material allowed to flow from each storage reservoir by one operation of the machine; Fig. 18, a vertical sectional view taken as indicated at line 18 of Fig. 17; Fig. 19, a vertical sectional view taken as indicated at line 19 of Fig. 7, showing the means for raising the vertically sliding gates which permit material to flow from the storage reservoirs into the feed-chutes; Fig. 20, an enlarged elevational view, showing a part of the mechanism controlling the movement of one of the feed belts used for causing a small stream of material to flow from the storage reservoir; Fig. 21, an end elevational view of the mechanism shown in Fig. 20; Fig. 22, a vertical sectional view taken as indicated at line 22 of Fig. 21; Fig. 23, a view similar to Fig. 21 showing some of the parts in altered positions; Fig. 24, a view similar to Fig. 23, showing some of the parts in altered positions.

In the preferred embodiment of the invention, which is illustrated, A represents the main frame which may be of any desirable construction. Preferably it is formed largely of light structural steel. As indicated it is provided with corner posts 30 which may comprise angle irons. The corner posts are suitably tied, strengthened, and braced by means of the horizontal cross members 31.

B represents a horizontally disposed vertically adjustable delivery- and discharge-conveyer supporting frame, comprising a pair of horizontal bars 33, located at opposite sides of the main frame, and having their ends slidably mounted in the vertical slides 34 fastened on the corner posts 30. The frame B is raised or lowered by means of vertical screws 35, whose upper ends are geared to two parallel horizontal shafts 36 connected by the chain 37 and adapted to be operated by the crank 38. The purpose of providing for raising or lowering the frame B is to adapt the machine to different size cartons, it being necessary that the cartons shall pass beneath the feed chutes 39$^a$ and 39$^b$.

40 indicates the main drive shaft on which is mounted the main drive pulley 41 which may be driven in any desired manner. 42 indicates a clutch of any desired form adapted to be operated by the lever 43 for the purpose of throwing the pulley 41 into connection with the shaft 40 or permitting it to rotate loosely thereon.

The sprocket 44 mounted on the shaft 40 adjacent the pulley 41 drives a chain 45 extending across the entire width of the machine near its lower end, which in turn drives the short horizontal shaft 46, geared at one end to the lower end of the vertical shaft 47 which carries at its upper end the bevel gear 48 adapted to drive in opposite directions the two bevel gears 49 and 50 arranged face to face and each meshing with the gear 48; the former operating a shaft 51 carrying a pulley upon which is mounted the endless belt delivery-conveyer 53, and the latter carrying a pulley 54 upon which is mounted similarly the endless belt discharge-conveyer 55. The other loops of the endless belts 53 and 55 are carried on loose pulleys (not shown) located near the machine, sufficient tension being maintained to keep the belts substantially flat. Suitable idler pulleys may also be provided, if desired, under the belts in order to prevent undue sagging. Rotation of the shaft 40 as viewed in Figure 2 is clockwise, resulting in giving the upper span of the delivery-conveyer belt 53 a movement toward the pulley on the shaft 51, or into the machine, and the upper span of the discharge conveyer belt 55 a movement in the opposite direction, or away from the pulley 54 and from the machine.

Empty cartons 56$^a$, 56$^b$, etc., are placed upon the delivery-conveyer belt 53 in any desired manner, whereupon they will be carried into the machine until the first one meets an adjustable stop 57 whereupon the others following will be stacked up against it in line as shown in Figure 8, with the belt 53 sliding underneath. Suitable adjustable guides 58, 59, 60, and 61 are provided at the sides of and slightly above the belt 53 to guide the inwardly moving empty cartons and prevent their displacement sideways. The stop 57 is so adjusted, and the cartons are of such a width, that when the first empty carton (56$^a$) is against the stop, it will be directly opposite and between the pusher 62 and the load-platform or scale-pan 63. Likewise, the third empty carton (56$^d$) from the first one (56$^a$) will be directly opposite and between the pusher 64 and scale-pan 65. Between the empty cartons 56$^a$ and 56$^d$ will be two empty cartons 56$^b$ and 56$^c$. As shown in Figure 8, the scale-pans 63 and 65 are occupied by two cartons, 66$^a$ and 66$^b$ respectively.

The operation of the machine in moving the empty cartons from the belt 53 onto the scale-pans and the loaded cartons from the scale-pans onto the discharge-conveyor belt 55 is as follows. When each of the cartons on the scale-pans has received its full charge the machine is set in operation, as will be described more in detail hereinafter, causing both pushers 62 and 64 to be moved against the empty cartons standing opposite them on the belt 53, forcing such cartons off of the belt onto the opposite scale-pans and displacing the loaded cartons on the scale-pans from the scale-pans onto the discharge-conveyer belt 55 whereupon they are carried to the left (as viewed in Figure 8) and out of the machine. Suitable adjustable guides 68, 69, and 70 are mounted to the sides of and above the belt 55 in order properly to direct the movement of the loaded cartons and prevent their displacement sideways. It will be obvious, that as two empty cartons are pushed from the belt 53 onto the scale-pans, more empty cartons will move forward with the belt 53 to take their place. As the loaded carton 56$^a$ is pushed onto the scale-pan 63 the empty carton 56$^b$ will take its place up against the stop 57, and all the other empty cartons on the belt 53 will move forward correspondingly. Likewise, as the empty carton 56$^d$ is pushed onto the scale-pan 65 the next succeeding empty carton (not shown on the drawings) on the belt 53 will move forward and take its place.

Directly above the carton 66$^a$ as it stands on the scale-pan 63 is a feed chute 39$^a$ from which or through which material is fed to the carton. The opening 72 at the bottom of the feed chute 39$^a$ is controlled by a horizontally sliding gate 75. Likewise, the opening 76 at the bottom of the feed chute 39$^b$, directly above the carton 66$^b$ standing on the scale-pan 65 is controlled by a horizontally sliding gate 78.

When the carton 66$^b$ has received a charge of a predetermined weight the scale-pan 65 will be depressed, releasing a trigger mechanism and setting in motion parts which will cause the gate 78 to be quickly sprung to the left (as viewed in Figure 12) closing the hole 76 at the bottom of the feed chute 39$^b$ thus immediately cutting off a further supply of material to the carton 66$^b$.

The operation of this trigger mechanism and parts in connection therewith will now be described more in detail and is as follows. The scale-pan 65 is supported by vertical rods 80 and 81 which are hung at their upper ends on knife edges 82 fastened on one end of the scale beams 83 which in turn are adapted to rock on the knife edges 84. The particular arrangement of the support for the scale-pans, and the construction of the scale beams form no part of the present invention as they are merely adaptations of a common form of construction used in scales. The scale beams 83 are joined at their ends by a short rod 84 carrying a single extension scale beam 83$^a$ upon which a slidable weight 85 is mounted in any suitable manner in order to adjust the mechanism so that a scale-pan will be depressed when the desired predetermined weight of material has entered the carton thereon. It is obvious, that depression of the scale-pan 65, acting through the supporting rods 81 will cause the scale beam 83 to rock on the knife edge 84 in the usual manner. As the end of the scale-beam 83 carrying the knife edge 82 is depressed with the depression of the scale-pan, the end of the extension scale beam 83$^a$ rises. The end of 83$^a$ carries a short vertical member 87 on the upper end of which is mounted a semi-circular spring piece 88. Upward movement of 83$^a$ with consequent upward movement of the spring piece 88 permits upward movement of the left end (as viewed in Fig. 11) of the short pivoted member 89 carrying on its upper side the screw 90 with its head in engagement with the lower side of the spring piece 88. The member 89 is pivoted at 91 with its right end (as viewed in Fig. 11) terminating in a small shoulder 92 adapted to engage with a downwardly projecting rod 93 carried by a horizontally arranged pivoted shaft 94. The shaft 94 carries an arm 95 projecting upwardly and to the left (as viewed in Fig. 11) supporting on its end a hammer 96. Upward movement of the left end (as viewed in Fig. 11) of the short pivoted member 89 will cause depression of the shoulder 92 with a consequent release of the lower end of the arm 93 projecting downwardly from the shaft 94 permitting rotation of such shaft and descent of the hammer 96. Descent of the hammer 96 (see Fig. 12) permits it to fall on the end 97 of the rocker 98 which is pivoted at 99 causing upward movement of the other end 100 of such rocker 98. Normally in engagement with the end 100 of the rocker 98 is the upper end 101 of a lever 102 pivoted at its lower end at 103 having near its central part a slot 104 in which is slidably arranged a pin 105 projecting horizontally from a slidably mounted horizontally arranged rod 106 attached to the sliding gate 78. The rod 106 carries at its left end (as viewed in Fig. 12) a stop 107 between which and the guide 108 is mounted a spiral compression spring 109. As viewed in Fig. 12, the gate 78 is at the limit of its movement to the right, leaving the opening 76 at the bottom of the feed-chute 39ᵃ open, and the spring 109 is compressed. As explained before, depression of the scale-pan 65 will cause the hammer 96 to fall causing depression of the end 97 of the member 98 and a raising of the end 100 with consequent release of the upper end 101 of the lever 102, which, as shown in Fig. 12, acting on the pin 105, is holding the rod 106 and gate 78 to the right with consequent compression of the spring 109. Such release of the upper end of the lever 102 consequently will permit the spring 109 to expand causing the rod 106 and gate 78 to move quickly to the left (as viewed in Fig. 12) closing the opening 76 at the bottom of the feed-chute 39ᵃ and immediately cutting off further supply of material to the carton thereunder. The operation of the gate controlling the opening 72 at the bottom of the feed-chute 39ᵃ is similar, with a duplication of parts, and consequently will not be described in detail.

As stated before, when the second carton of the two on the scale-pan has received its full charge and depressed its scale-pan, the machine will be set into motion in order to complete one operation. By "one operation" we mean the pushing of two new empty cartons from the delivery-conveyer onto the scale-pans displacing the loaded cartons and pushing them onto the discharge-conveyer; the re-opening of the gates at the bottom of the feed-chutes (the after flow from the previous cut-off falling into the cartons) with the resetting of the trigger mechanism controlling each; the supply of a relatively large quantity of material quickly from each storage reservoir into a carton (the material thus supplied however not being sufficient to give a complete charge to a carton; and the depression of the scale-pan from the impact or momentum of such material being prevented); and the continuing of a supply of additional material to each carton by a small slowly moving stream flowing from each storage reservoir.

We will now describe in detail the manner in which the machine is so set into motion. The horizontally sliding gate 78 at the bottom of the feed-chute 39ᵇ has fastened to one side a wedge shaped member 110 so arranged that as the gate is forced shut its slanting surface will engage the end of the pin 111 and force the same upward. The other end of the pin 111 is inserted in the horizontally arranged rotatable shaft 112 which has projecting from one end the arm 113, so that rotation of the shaft 112 caused by such upward movement of the end of the pin 111 will raise the end of the arm 113 to which is fastened a connecting rod 114 thus raising said connecting rod. The lower end of the rod 114 is connected to one arm 115 of a bell crank pivoted at 116, the other end of such bell crank projecting upwardly as indicated by 117 with its upper end adapted to engage the pawl 118. The parts are so arranged that the closing of the gate 78 with consequent raising of the pin 111, rotation of shaft 112, lifting of arm 113, connecting rod 114, and arm 115 of a bell crank carrying the upright arm 117 will cause said upper arm to swing to the left (as viewed in Fig. 4), releasing the same from the pawl 118. The horizontally slidable gate controlling the opening to the feed-chute 39ᵃ has similar parts adapted to operate the arm 119 in a similar manner, excepting that the pin 120 corresponding to the pin 111 is adapted to be pressed downward by closing of the sliding gate 75 instead of upward. This is accomplished by inverting the wedge shaped member on the sliding gate 75 corresponding to the member 110 on the gate 78. Downward movement of the arm 120 is adapted to rotate the shaft 121, and lower the connecting rod 122 by means of the arm 123 depressing the arm 124 and throwing to the left (as viewed in Fig. 4) the corresponding upright arm 119.

As described in detail above, filling of one of the cartons with consequent depression of its scale-pan will release the trigger mechanism permitting the horizontally sliding gate to close and cut off the feed. The closing of the gate, as above described in detail, will throw one of the two levers 117 and 119 out of engagement with the pawl 118. The closing of the other gate will likewise throw the other lever out of engagement with the pawl 118. These two levers are clearly shown in Fig. 6 being the outer ones of three similar levers. The purpose and function of the middle lever of the three will be explained hereinafter.

Upon the release of the two levers 117 and 119 from the pawl 118 the machine will be set in motion as follows. The shaft 40 rotates continuously. Such rotation acting through the sprocket 130 and the chain 131 serves to continuously rotate the sprocket 132 mounted on the shaft 133. The sprocket 132 is so mounted on the shaft 133 that when any one of the three arms 117, 119, and the arm between such two, is in engagement with the pawl 118 the sprocket 132 is free to rotate on the shaft 133. A clutching mechanism of any desired form, the details of which are not shown, is so arranged that when the arms 117, 119, and the intermediate arm between these two, are released from engagement with the pawl 118 such pawl will be sprung downward a short distance throwing into operation such clutching mechanism to clutch the sprocket 132 to the shaft causing such shaft to rotate with the sprocket. Such clutching mechanism is so designed that the pawl 118 will rotate with the shaft 133, but as soon as it comes into engagement again with either of the levers 117 or 119, or the intermediate lever, it will release such clutching mechanism thereby immediately stopping rotation of the shaft 133 and permitting the sprocket 132 again to rotate freely thereon.

During one operation of the machine, as referred to above, the shaft 133 will make one complete rotation.

We will now describe in detail the means of operating the pushers 62 and 64 which push in the empty cartons onto the scale-pans thus displacing the loaded ones. These pushers are arranged on suitable slides and are operated by means of the arms 550 and 551 which are moved by rotation of the shaft 552 caused by operation of the cam roller 553 in the cam groove 554 on the wheel 555 which is mounted on the shaft 133.

We will now describe in detail the manner of opening the sliding gates 75 and 78, that is the manner of pulling them back compressing the springs 109. The shaft 133 carries at one end the cam 134 adapted to engage the cam roller 135 at the lower end of the vertical rod 136. The cam 134 is so cut that one rotation of the shaft 133 will cause upward movement of the rod 136. The upper end of the rod 136 is fastened to the horizontal arm of a bell crank 145 pivoted at 146 and having a depending arm 147 carrying on its lower end one end of a horizontal connecting rod 148, (see Fig. 12) the other end of which is suitably supported by a depending swinging rod 149. It is obvious that upward movement of the rod 136 will cause rotation of the bell crank 145 and consequent movement to the right (as viewed in Fig. 12) of the connecting rod 148. The connecting rod 148 carries projecting pins 150 adapted to engage with pins 151 projecting downwardly from the gates 75 and 78. The parts are so adjusted that upward movement of the rod 136 caused by the cam 134 will cause movement of the pins 150 against the pressure of the springs 109 a sufficient distance until the end 100 of the member 98 again engages with the upper end 101 of the arm 102.

We will now describe in detail the manner in which the trigger mechanism controlling the sliding gates 75 and 78 is reset during one operation of the machine. The shaft 133 carries at one end the cam 134 adapted to engage the cam roller 135 at the lower end of the vertical rod 136. The cam 134 is so cut that one rotation of the shaft 133 will cause upward movement of the rod 136. Such upward movement of the rod 136 acting against the pin 137 rotates the horizontally arranged shaft 138 which in turn moves downward the eyes 139 on the ends of pins projecting from the shaft 138, causing such eyes to engage with the stops 140 on the vertically arranged rods 141 causing their movement downward. (See Fig. 2.) Such downward movement of the rods 141 depresses the short rods 142 which are hollowed (as indicated by 143) (see Fig. 15) to engage with pins 144 projecting from the shafts 94 on the sides opposite to the pins 95 carrying the hammers 96. It is obvious that such depression of the pins 144 with consequent raising of the hammers 96 will permit the trigger mechanisms to reset themselves as the gates 75 and 78 are again opened in the manner described heretofore. That is, as the gate 78 is moved to the right (as viewed in Fig. 12) the end 100 of the member 98 will again drop down into engagement with the upper end of the lever 102, and the lower end of the arm 93 will again be brought into engagement with the shoulder 92. Similarly, the trigger mechanism in connection with the sliding gate 75 will be reset when such gate is again opened.

As stated before, when the machine makes one operation, a relatively large quantity of material is allowed to flow into each feed-chute from a corresponding storage reservoir. This quantity however does not constitute a full charge for a carton. This relatively large amount is permitted to flow quickly in order to give the carton very nearly its full charge in order to permit more rapid operation of the machine than if the entire charge were fed into a carton by a small stream. It is obvious that the last of the charge, however, must be fed by means of a small stream in order to permit the predetermined weight to be reached but not exceeded. In other words, in the operation of the machine, a relatively large amount of material is dumped from the storage reservoir direct through the feed-chute into the carton thus giving the carton nearly a full load. Some material is then fed in a small stream from the storage reservoir through the feed-chute into the carton until the predetermined weight has been reached, when the trigger mechanism is released, as described above, permitting the horizontally sliding gate to snap shut thus preventing more material from entering the carton. With the snapping shut of the gate the small stream of material flowing from the storage reservoir is also stopped, but this is not accomplished without some afterflow. It is obvious however that such afterflow will be caught in the feed-chute and retained therein until the empty carton has been placed underneath and the horizontal sliding gate again opened, whereupon it will drop into such empty carton.

We will now describe in detail the manner in which such relatively large supply of material is fed from a storage reservoir into a carton. Slightly to the side of and above the feed-chute 39$^a$ is located the storage reservoir 160. Likewise, the feed-chute 39$^b$ has its storage reservoir 161. The manner of supplying material from each of the storage reservoirs into its respective feed-chute is the same, consequently the operation of but one will be described in detail. For the purpose of this detailed description we will consider the feed-chute 39$^b$ with its storage reservoir 161. The storage reservoir 161 has its bottom closed by the upper surface of an endless belt 162 spanned between two pulleys 163 and 164. As viewed in Fig. 10, the upper surface 162 of the endless belt moves to the right. It will be noted that the belt extends into the top of the feed-chute 39$^b$. The face of the reservoir 161 adjacent the feed-chute 39$^b$ has an opening 166 controlled by a vertically slidable gate 167. As shown in Figs. 9 and 10, the gate 167 is at its lowest point, leaving a slight crack or slot 170 below the gate and above the belt 162. It is obvious, that movement of the belt 162 will cause material to flow out through the slot 170 and drop into the feed-chute 39$^b$. The gate 167 is manually adjustable in a frame 172 by means of the screw 173 as shown. Upward movement of the frame 172 is adapted to lift the gate 167 and its corresponding gate 175 on the storage reservoir 160. As shown in Figs. 9 and 10 the gates are so set in the frame 172 by means of the screws 173 and 176, that when the frame 172 is at its lowest point, the slots 170 and 177 under the gates will be just sufficient to permit movement of the belts 162 and 178 to cause a small stream of material to flow slowly from each storage reservoir into its corresponding feed chute. It is obvious, that adjustment of the gates 167 and 175 in the frame 172 by means of the screws 173 and 176 will depend to a great extent upon the kind, condition, weight, and fineness of material, and also upon the speed of the belts 162 and 178. It is obvious, that such a stream of slowly flowing material would require a long time to give a carton its full charge. Consequently, the means, referred to above, for supplying a relatively large amount of material into each carton quickly are provided as follows. In general, this is accomplished by raising the frame 172 for a short space of time during each operation of the machine, thus lifting both gates 167 and 175 permitting a large quantity of material to flow quickly from each storage reservoir. The height to which the gates are lifted and the speed with which they are so lifted is so regulated however that the relatively large quantity of material thus dumped from each storage reservoir will not give a full load to the carton. As explained before, after this relatively large amount is dumped into the carton the slowly moving small stream of material continues to flow through the slot 170 until the carton has received a charge of a predetermined weight when the gate at the bottom of the feed chute 39$^b$ snaps shut as explained heretofore thus immediately cutting off a further supply of material to the carton. At the time the gate is thus closed, movement of the belt 162 is also stopped in order to prevent any undue afterflow or excess supply of material from the storage reservoir into the feed chute. It is obvious however that there will be some afterflow, this, as explained before, is caught in the feed chute and prevented from going into the filled carton. It remains in the feed chute caught by the gate 78, until a new carton has been placed underneath. The frame 172 is raised during each operation of the machine by means of a downward pull on the rod 200 operating through the pivoted arm 201 and short link 202 joined to the frame 172. The downward pull on the rod 200 is accomplished by an upward movement of the rod 206 which is connected at its upper end to the lower end of the rod 200 through the centrally pivoted rocking arm 207. Upward movement of the rod 206 is accomplished as follows (see Figures 6, 7, 17, 18, and 19). The continuously rotating shaft 40, by means of the sprocket 210, chain 211, and sprocket 212 drives a shaft 213 which in turn is geared to the shaft 214, causing continuous rotation of the shaft 214. The shaft 214 carries a toothed wheel 215 rigidly mounted to it, and adjacent such toothed wheel 215 is rotatably mounted a cam wheel 216. Pivotally fastened onto the cam 216 is a pawl 217 with a shoulder 218 adapted to engage with the teeth on the wheel 215. The spring 219 normally tends to move the shoulder 218 in engagement with the teeth on the wheel 215. The pawl 217 has, however, a backwardly extending arm 220 adapted to engage with the upper end of a vertically arranged arm 221 pivoted at 222. As shown in Figure 19, the member 221 is in engagement with the arm 220, holding the shoulder 218 out of engagement with the teeth on the wheel 215 thus preventing rotation of the cam wheel 216. The lower end of the arm 221 has an arm 225 extending horizontally with its end in engagement with a collar 226 on the shaft 133. The collar 226 carries a pin 227 adapted to engage the arm 225 when the shaft 133 rotates thus swinging the arm 225 downward and the arm 221 to the right (as viewed in Figure 19) releasing the arm 221 permitting 219 to force the shoulder 218 into engagement with the teeth on the wheel 215, thus causing rotation of the cam 216. It is obvious, that by the time one rotation of the cam has been made that the pin 227 will again be out of engagement with the arm 225 so that as the cam 216 completes one rotation the arm 220 will again meet the upper end of the arm 221 throwing the shoulder 218 out of engagement with the teeth on the wheel 215 thus preventing further rotation of the cam 216 until the shaft 133 again makes another rotation. As stated before, the shaft 133 makes one complete rotation for each operation of the machine. The pin 227 is so located, and the speed of the shaft 214 is so geared that the cam 216 upon being released as just described will make one complete rotation. In engagement with the cam 216 is the cam roller 230 adapted to lift the rod 206 acting through the arm 231. The connection between the lower end of the arm 206 and the arm 231 may be varied by means of a series of holes 233 in order to vary the lift of the arm 206 and thus regulate the lift of the gates carried on the frame 172. In order to vary the speed of the shaft 214 a series of gears, or change speed mechanism of any desired form (see Figs. 17 and 18) are provided. As here shown this mechanism comprises three pairs of meshing gears 250, 251 and 252, any one of which pairs may be used independently of the other two.

It is obvious that the relatively large quantity of material dumped through the feed-chute from the storage reservoir falling into a carton would cause a release of the tripping mechanism controlling the gate at the bottom of the feed-chute and thus start the machine into motion even though the weight of material was not sufficient to give a full charge. This action would result because of the momentum of the material even though its weight alone would not be sufficient to depress the scale-pan. In order to prevent this action the rod 141 carries near its upper end the vertical rod 500 with its upper end bent horizontally as indicated at 501 to extend over the scale beam 83$^a$. The parts are so arranged that during the time that the relatively large supply of material, described above, is being dumped into a carton the rod 141 is depressed, pulling the projection 501 down over the scale-beam 83$^a$ thus preventing it from rising and releasing the trigger mechanism.

We will now describe in detail the manner of stopping the movement of the belts 162 and 178 at the time the gates 75 and 78 are closed. As described before the closing of such gates, through the operation of the wedge shaped members 110 acting against the pins 111 and 120 causes rotation of the shafts 112 and 121. Such rotation of the shafts 112 and 121 acting through arms 260 and 261 respectively and the other connecting rods 262 and 263 serve to unclutch the pulleys carrying the belts 162 and 178 from the shaft 290 by which they are driven. The manner in which is done will now be described with particular reference to the belt 178. The pulley on the shaft 290 which carries the belt 178 is indicated by 178$^a$ (see Figs. 20 to 24). The shaft 290 is given continuous rotation from the shaft 40 by means of the sprocket 300, chain 301, sprocket 302, and bevel gears 303. The pulley 178$^a$ is loosely mounted on the shaft 290 and carries a flat disk 340. Adjacent the disk 340 and pinned on the shaft 290 is the small toothed wheel 341. On the other side of the small toothed wheel 341 is the loosely mounted larger toothed wheel 342. A small pawl 343 is pivotally mounted on the disk 340 at 345. This pawl has a shoulder 346 adapted to engage with the teeth on the wheel 341 and is also provided with a slot 347 adapted to engage with a pin 348 in the wheel 342. Rotation of the parts as viewed in Fig. 21 is counter clockwise. It is obvious that if the wheel 342 is prevented from rotating, the pin 348 engaging with the slot 347 will rock the pawl 343 and disengage the shoulder 346 from the teeth on the wheel 341 thus stopping rotation of the disk 340 and the pulley 178$^a$. This operation is illustrated progressively in Figs. 21, 23, and 24. Such release of the shoulder 345 from the teeth of the wheel 341 causes a slight extension of the spiral spring 380 which joins the toothed wheel 342 to the disk 340. Upon release of the wheel 342 so that it is again free to rotate, contraction of the spring 380 will take place, rotating it in advance a short distance causing pawl 343 to again rock on its pivot 345 through engagement with the pin 348 with the slot 347 again bringing shoulder 346 into engagement with the teeth on the wheel 341 again causing rotation of the pulley 178a through the disk 340. A small spring 385 normally serves to hold the shoulder 346 out of engagement unless the parts are otherwise operated. The spring 380 however is strong enough to overcome the action of the spring 385 when the wheel 342 is released. The wheel 342 is stopped by the end of the vertically arranged pivoted cam 400 (see Fig. 1) operated by the connecting rod 401 and bell crank 402 joined to the arm 263.

We will now describe in detail the timing and controlling mechanism. This comprises a third middle arm 600 similar to the arms 117 and 119 and lying between them adapted to engage with the pawl 118. This arm is in a position so that it will engage the pawl 118 upon rotation of the shaft 133. It is held in such position by contact of the roller 660 with the periphery of the wheel 661 and arm 664. (See Fig. 4.) The wheel 661 is provided with a depression 667 adapted to accommodate the roller 660 permitting the arm 662 to rock thus lowering the connecting rod 663 and removing the upper end of the arm 600 to a position where it will not be engaged by the pawl 118 upon rotation of the shaft 133. Mounted on the hub carrying the sprocket 132 and continuously rotating therewith is a sprocket 700 carrying a chain 701 adapted to rotate continuously the sprocket 702 mounted on the shaft 703. (See Figs. 1, 4, and 6.) The wheel 661 is rotatably mounted on the shaft 703 and provided with clutching means so that it normally will rotate with the shaft, except when the pawl 800 engages with the end of the arm 801. The pawl 800 is so located that when it so engages with the arm 801 the depression 667 will be at the bottom (see Fig. 4) with the roller 660 resting therewith thus throwing the arm 600 out of engagement with the pawl 118. The arm 801 is operated by means of the vertically sliding rod 850 carrying the cam roller 851 resting on the cam surface 852 on the wheel 555. The parts are so arranged that after the machine has completed one operation, that is one rotation of the shaft 133, the depression 667 will be at the bottom thus releasing the arm 600 from the pawl 118. When the wheel 661 is in this position the cam roller 851 is down and the arm 801 is in engagement with the pawl 800 thus preventing further rotation of the wheel 661. When in this position the machine is ready to start, and as soon as the arms 117 and 119 are moved out of engagement with the pawl 118 by the sliding gates, as explained before, rotation of the shaft 133 will commence and the pawl 118 will clear the ends of the three levers 117, 119, and 600. The cam surface 852 is so arranged and formed that soon after such rotation commences the cam roller 851 will be raised throwing the arm 801 out of engagement with the pawl 800 thus commencing rotation of the wheel 661, thus lowering the roller 660, moving the arm 600 to a position where it will be again engaged by the pawl 118 after the shaft 133 has made one rotation, thus stopping the shaft at the completion of one such rotation and preventing further movement. It will be noted that the sprocket 702 is slightly larger than the sprocket 700 thus causing rotation of the wheel 661 somewhat slower than the shaft 133. It will be seen therefore that after rotation of the shaft 133 has been stopped by the arm 600 it will be a short time before the depression 667 again reaches the bottom to release the arm 600. This will give time for the sliding gates to be reset and the arms 117 and 119 again to be brought to a position where they will engage the pawl 118. After all three arms 117, 119, and 600 are thus in engagement with the pawl 118, the wheel 661 will complete its rotation thus releasing the arm 600 whereupon the machine will be ready to commence a new operation upon the release of the other two arms 117 and 119 by the sliding gates as explained heretofore. The cam 852 is so formed that shortly after the arm 801 has been freed from the pawl 800 and the wheel 661 commences its rotation, the roller 851 will again be lowered moving the arm 801 back to a position where it will again stop the wheel 661 upon the completion of one rotation.

A pawl 900 is provided adapted to engage with the teeth 901 on a wheel 902 mounted on the shaft 133 in order to prevent backward rotation of the shaft 133.

Agitators 905 are provided in the storage reservoirs in order to keep the material therein stored up. These agitators are operated by a chain and sprocket connection to the shaft 290.

Although we have set forth in detail the actual construction of our machine, we fully realize that it can be modified and we do not intend to limit ourselves to such accuracy of description except as we shall hereafter point out in the claims wherein the particular features of our invention reside; and while we have shown and described but a single embodiment of our invention, it is to be understood that it is capable of many modifications. For example, the machine may be made to operate on only one carton at a time, or on more than two simultaneously. Changes therefore in the construction and arrangement may be made without departing from the spirit and scope of the invention as disclosed in the appended claims, in which it is our intention to claim all novelty inherent in our invention as broadly as possible in view of the prior art.

What we claim as new and desire to secure by Letters Patent is:

1. In a machine of the character set forth, a plurality of scales, each having a scale-pan adapted to contain a carton, storage reservoirs containing a supply of material, means for feeding material from the storage reservoirs to cartons standing on the scale-pans, means set in operation by the depression of each scale-pan for cutting off the feeding of material to the carton standing thereon, a mechanism for removing loaded cartons from the scale-pans and supplying empty cartons thereto, and means for setting said mechanism in operation by the depression of the last scale-pan.

2. In a machine of the character set forth, a scale with a scale-pan adapted to contain a carton, a storage reservoir for containing a supply of material, means for feeding material from the storage reservoir into a carton standing on the scale-pan, means operated by the depression of a scale-pan for cutting off the feeding of material to the carton, a mechanism adapted to remove a loaded carton from the scale-pan and supply an empty carton thereto, mechanism to start the feeding of material to the new empty carton, means adapted to set said last named mechanism into operation by the depression of the scale-pan, and means for preventing more than one operation of said mechanism until after the exchange of cartons on the scale-pan has been completed.

3. In a machine of the character set forth, a scale-pan adapted to contain the carton, means for holding a supply of material, means for feeding a relatively large amount (less than a full load) of material quickly into the carton, means for continuing the supply of material in a small stream, a trigger mechanism to shut off the stream of material to the carton, such trigger mechanism adapted to be operated when a quantity of a predetermined weight has entered the carton, and means for preventing the operation of such trigger mechanism upon the introduction of the relatively large amount of material quickly into the carton.

4. In a machine of the character set forth, a scale having a scale-pan adapted to accommodate a carton, a storage reservoir for holding a supply of material, means for feeding material from the storage reservoir into a carton standing on the scale-pan, scale-controlled means for cutting off close to the carton the stream of material entering the same and similarly controlled means for stopping the feeding of material from the storage reservoir.

5. In a machine of the character set forth, a scale having a scale-pan adapted to accommodate a carton, a storage reservoir for holding a supply of material, a feed chute adapted to direct flow of material from the storage reservoir into a carton standing on the scale-pan, means for feeding material from the storage reservoir into the feed chute, scale-controlled means for cutting off flow of material from the feed chute into a carton and similarly controlled means for stopping the feeding of material from the storage reservoir into the feed chute.

6. In a machine of the character set forth, a scale having a scale-pan adapted to accommodate a carton, a storage reservoir for holding a supply of material, a feed chute adapted to direct flow of material from the storage reservoir into a carton standing on the scale-pan, means for feeding a relatively large amount (less than a full load) of material quickly from the storage reservoir into the feed chute, means for cutting down such feeding to a small stream, scale-controlled means for cutting off flow of material from the feed chute into a carton and similarly controlled means for stopping the feeding of material from the storage reservoir into the feed chute.

7. In a machine of the character set forth, a scale having a scale-pan adapted to accommodate a carton, a storage reservoir for holding a supply of material, a feed chute adapted to direct flow of material from the storage reservoir into a carton standing on the scale-pan, means for feeding a relatively large amount (less than a full load) of material quickly from the storage reservoir into the feed chute, scale-controlled means for cutting down such feeding to a small stream, scale-controlled means for cutting off flow of material from the feed chute into a carton and similarly controlled means for stopping the feeding of material from the storage reservoir into the feed chute.

8. In a machine of the character set forth, a scale having a scale-pan adapted to accommodate a carton, a storage reservoir for holding a supply of material, a feed chute adapted to direct flow of material from the storage reservoir into a carton standing on the scale-pan, means for feeding a relatively large amount (less than a full load) of material quickly from the storage reservoir through the feed chute into a carton standing on the scale-pan, means for cutting down such feeding to a small stream, a mechanism adapted to cut off flow of material from the feed chute into the carton and stop feeding of material from the storage reservoir into the feed chute, such mechanism adapted to be operated when a quantity of a predetermined weight has entered the carton, and means for preventing the operation of such mechanism upon the introduction of a relatively large amount of material quickly into the carton.

9. In a machine of the character set forth, a delivery conveyor leading to the machine, a discharge conveyor leading from the machine, a scale having a scale-pan interposed between the delivery conveyor and the discharge conveyor, and adapted to accommodate a carton, a feed chute located above the scale-pan and adapted to direct material into a carton standing on the scale-pan, a storage reservoir for containing a supply of material, means for periodically feeding a relatively large quantity (less than a full load) of material quickly from the storage reservoir through the feed chute into a carton standing on the scale-pan, means for preventing the depression of the scale-pan from the impact or momentum of such relatively large quantity of material, means for cutting down the feeding of material from the storage reservoir and continuing said feeding in a small stream, and means for closing the bottom of the feed chute as soon as a quantity of material of predetermined weight has entered the carton underneath.

10. In a machine of the character set forth, a delivery conveyor leading to the machine, a discharge conveyor leading from the machine, a scale having a scale-pan interposed between the delivery conveyor and the discharge conveyor, and adapted to accommodate a carton, a feed chute located above the scale-pan and adapted to direct material into a carton standing on the scale-pan, a storage reservoir for containing a supply of material, means for periodically feeding a relatively large quantity (less than a full load) of material quickly from the storage reservoir through the feed chute into a carton standing on the scale-pan, means for preventing the depression of the scale-pan from the impact or momentum of such relatively large quantity of material, means for cutting down the feeding of material from the storage reservoir and continuing said feeding in a small stream, means for closing the bottom of the feed chute as soon as a quantity of material of predetermined weight has entered the carton underneath, and means for stopping the feeding of material from the reservoir when a quantity of a predetermined weight has entered the carton.

11. In a machine of the character set forth, a delivery conveyer leading to the machine, a discharge conveyer leading from the machine, a scale having a scale-pan interposed between the delivery conveyer and the discharge conveyer, and adapted to accommodate a carton, a feed chute located above the scale-pan and adapted to direct material into a carton standing on the scale-pan, a storage reservoir for containing a supply of material, means for periodically feeding a relatively large quantity (less than a full load) of material quickly from the storage reservoir through the feed chute into a carton standing on the scale-pan, means for preventing the depression of the scale-pan from the impact or momentum of such relatively large quantity of material, means for cutting down the feeding of material from the storage reservoir and continuing said feeding in a small stream, means for closing the bottom of the feed chute as soon as a quantity of material of predetermined weight has entered the carton underneath, means for stopping the feeding of material from the reservoir when a quantity of a predetermined weight has entered the carton, and means for pushing an empty carton from the delivery conveyor onto the scale-pan, at the same time displacing a loaded carton from the scale-pan onto the discharge conveyor.

12. In a machine of the character set forth, a delivery conveyor leading to the machine, a discharge conveyor leading from the machine, a plurality of scales each having a scale-pan interposed between the delivery conveyor and the discharge conveyor, a feed chute located above each of the scale-pans, and adapted to direct material into a carton standing on the scale-pan underneath, a storage reservoir in connection with each of the feed chutes adapted to supply material thereto, means for periodically feeding a relatively large quantity (less than a full load) of material quickly from the storage reservoir through each feed chute into a carton standing on the scale-pan underneath, means for preventing the depression of each scale-pan from the impact or momentum of such relatively large quantity of material, means for cutting down the feeding of material to each feed chute and continuing such feeding in a small stream, and means for closing the bottom of each feed chute as soon as a quantity of material of predetermined weight has entered the carton underneath.

13. In a machine of the character set forth, a delivery conveyor leading to the machine, a discharge conveyor leading from the machine, a plurality of scales each having a scale-pan interposed between the delivery conveyor and the discharge conveyor, a feed chute located above each of the scale-pans and adapted to direct material into a carton standing on the scale-pan underneath, a storage reservoir in connection with each of the feed chutes adapted to supply material thereto, means for periodically feeding a relatively large quantity (less than a full load) of material quickly from the storage reservoir through each feed chute into a carton standing on the scale-pan underneath, means for preventing the depression of each scale-pan from the impact or momentum of such relatively large quantity of material, means for cutting down the feeding of material to each feed chute and continuing such feeding in a small stream, means for closing the bottom of each feed chute as soon as a quantity of material of predetermined weight has entered the carton underneath, and means for stopping the feeding of material from the storage reservoir into each feed chute when a quantity of a predetermined weight has entered the carton underneath the feed chute.

14. In a machine of the character set forth, a delivery conveyor leading to the machine, a discharge conveyor leading from the machine, a plurality of scales each having a scale-pan interposed between the delivery conveyor and the discharge conveyor, a feed chute located above each of the scale-pans and adapted to direct material into a carton standing on the scale-pan underneath, a storage reservoir in connection with each of the feed chutes adapted to supply material thereto, means for periodically feeding a relatively large quantity (less than a full load) of material quickly from the storage reservoir through each feed chute into a carton standing on the scale-pan underneath, means for preventing the depression of each scale-pan from the impact or momentum of such relatively large quantity of material, means for cutting down the feeding of material to each feed chute and continuing such feeding in a small stream, means for closing the bottom of each feed chute as soon as a quantity of material of predetermined weight has entered the carton underneath, and means for pushing empty cartons from the stationary conveyor onto the scale-pans, at the same time displacing loaded cartons from the scale-pans onto the discharge conveyor.

15. In a machine of the character set forth, a delivery conveyor leading to the machine, a discharge conveyor leading from the machine, a plurality of scales each having a scale-pan interposed between the delivery conveyor and the discharge conveyor, a feed chute located above each of the scale-pans and adapted to direct material into a carton standing on the scale-pan underneath, a storage reservoir in connection with each of the feed chutes adapted to supply material thereto, means for periodically feeding a relatively large quantity (less than a full load) of material quickly from the storage reservoir through each feed chute into a carton standing on the scale-pan underneath, means for preventing the depression of each scale-pan from the impact or momentum of such relatively large quantity of material, means for cutting down the feeding of material to each feed chute and continuing such feeding in a small stream, means for closing the bottom of each feed chute as soon as a quantity of material of predetermined weight has entered the carton underneath, and mechanism for pushing empty cartons from the stationary conveyor onto the scale-pans, at the same time displacing loaded cartons from the scale-pans onto the discharge conveyor, such mechanism being set into operation by the introduction of changes of predetermined weights into all of the cartons.

16. In a machine of the character set forth, a delivery conveyor leading to the machine, a discharge conveyor leading from the machine, a scale having a scale-pan interposed between the stationary conveyor and the discharge conveyor, and adapted to accommodate a carton, a feed chute located above the scale-pan and adapted to direct material into a carton standing on the scale-pan, a storage reservoir for containing a supply of material, means for periodically feeding a relatively large quantity (less than a full load) of material quickly from the storage reservoir through the feed chute into a carton standing on the scale-pan, means for preventing the depression of the scale-pan from the impact or momentum of such relatively large quantity of material, means for cutting down the feeding of material from the storage reservoir and continuing said feeding in a small stream, means for closing the bottom of the feed chute as soon as a quantity of material of predetermined weight has entered the carton underneath, means for stopping the feeding of material from the reservoir when a quantity of a predetermined weight has entered the carton, and mechanism for pushing an empty carton from the delivery conveyor onto the scale-pan, at the same time displacing a loaded carton from the scale-pan onto the discharge conveyor, such mechanism being set into operation by the introduction of a load of predetermined weight into the carton.

17. In a machine of the character set forth, a delivery conveyor leading to the machine, a discharge conveyor leading from the machine, a plurality of scales each having a scale-pan interposed between the delivery conveyor and the discharge conveyor, a feed chute located above each of the scale-pans and adapted to direct material into a carton standing on the scale-pan underneath, a storage reservoir in connection with each of the feed chutes adapted to supply material thereto, means for periodically feeding a relatively large quantity (less than a full load) of material quickly from the storage reservoir through each feed chute into a carton standing on the scale-pan underneath, means for preventing the depression of each scale-pan from the impact or momentum of such relatively large quantity of material, means for cutting down the feeding of material to each feed chute and continuing such feeding in a small stream, means for closing the bottom of each feed chute as soon as a quantity of material of predetermined weight has entered the carton underneath, means for stopping the feeding of material, from the storage reservoir into each feed chute when a quantity of a predetermined weight has entered the carton underneath the feed chute and means for pushing empty cartons from the stationary conveyor onto the scale-pans, at the same time displacing loaded cartons from the scale-pans onto the discharge conveyor.

18. In a machine of the character set forth, a delivery conveyor leading to the machine, a discharge conveyor leading from the machine, a plurality of scales each having a scale-pan interposed between the delivery conveyor and the discharge conveyor, a feed chute located above each of the scale-pans and adapted to direct material into a carton standing on the scale-pan underneath, a storage reservoir in connection with each of the feed chutes adapted to supply material thereto, means for periodically feeding a relatively large quantity (less than a full load) of material quickly from the storage reservoir through each feed chute into a carton standing on the scale-pan underneath, means for preventing the depression of each scale-pan from the impact or momentum of such relatively large quantity of material, means for cutting down the feeding of material to each feed chute and continuing such feeding in a small stream, means for closing the bottom of each feed chute as soon as a quantity of material of predetermined weight has entered the carton underneath, means for stopping the feeding of material from the storage reservoir into each feed chute when a quantity of a predetermined weight has entered the carton underneath the feed chute and mechanism for pushing empty cartons from the stationary conveyor onto the scale-pans, at the same time displacing loaded cartons from the scale-pans onto the discharge conveyor, such mechanism being set into operation by the introduction of changes of predetermined weights into all of the cartons.

In testimony whereof we have hereunto placed our hands and seals this 6th day of November 1920.

JACKSON G. PIESER. [L. S.]
ARTHUR L. QUAST. [L. S.]
JOHN C. QUAST. [L. S.]